(No Model.)
J. P. MONNETT.
THRASHING MACHINE AND SEPARATOR.
No. 436,182.  Patented Sept. 9, 1890.
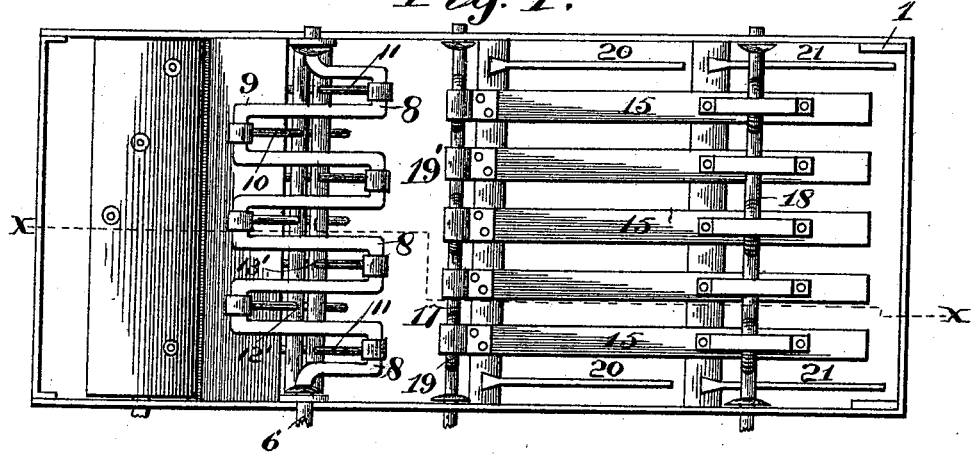
Fig. I.
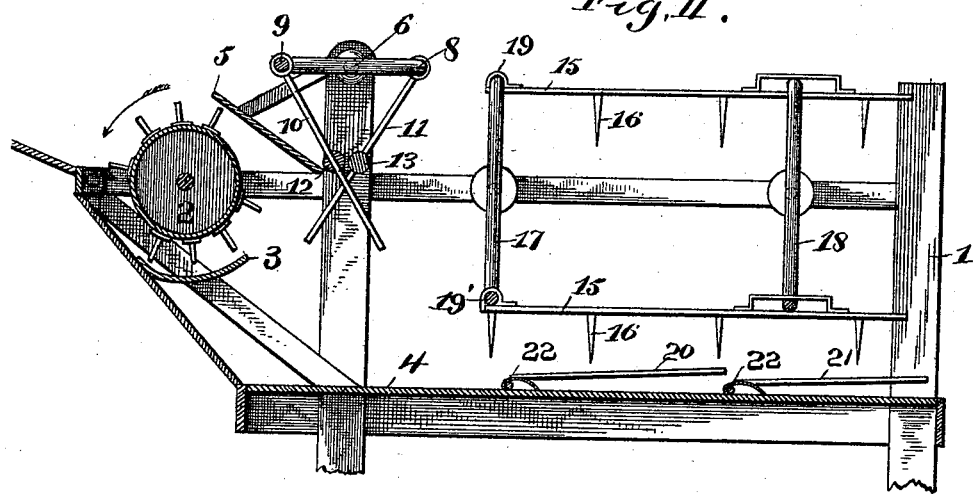
Fig. II.
Fig. III.  Fig. IV.
Witnesses:  Inventor,

UNITED STATES PATENT OFFICE.

JOHN P. MONNETT, OF LONG PINE, NEBRASKA.

THRASHING-MACHINE AND SEPARATOR.

SPECIFICATION forming part of Letters Patent No. 436,182, dated September 9, 1890.

Application filed February 24, 1890. Serial No. 341,479. (No model.)

*To all whom it may concern:*

Be it known that I, JOHN P. MONNETT, a citizen of the United States, residing at Long Pine, in the county of Brown and State of Nebraska, have invented certain new and useful Improvements in Thrashing-Machines and Separators; and I do hereby declare the following to be a full, clear, and exact description of the invention, such as will enable others skilled in the art to which it appertains to make and use the same.

My invention relates to improvements in thrashing-machines and separators; and the object of the invention is to provide the machine with means which act to separate the bunch of straw after it leaves the cylinder and to carry the same rearwardly to a series of reciprocating pickers, which pickers operate to carry the straw out of the rear end of the machine to uniformly distribute the straw over the surface of the grain-pan, and thus expedite the separation of the grain from the straw.

With these and other ends in view my invention consists in the combination of devices and peculiar construction and arrangement of parts, as will be hereinafter fully described.

To enable others to understand my invention, I will now proceed to a detailed description thereof in connection with the accompanying drawings, in which—

Figure I is a plan view of a part of a thrashing-machine with the top of the casing removed to show my improvements therein. Fig. II is a longitudinal sectional view of a part of a thrashing-machine having my improvements applied thereto. Figs. III and IV are enlarged views of the vertically-reciprocating bars, the crank-shaft to which they are connected, and the parts of the machine adjacent thereto.

Like numerals of reference denote corresponding parts in all the figures of the drawings, referring to which—

1 designates the casing or frame, 2 the rotary cylinder, 3 the concave, and 4 the grain-pan, of an ordinary thrashing-machine.

In rear of the rotary cylinder and on a plane above the path of the straw after it passes the cylinder and concave is arranged a vertically-inclined grain-board 5, which extends from the cylinder toward the rear of the machine, and in rear of this grain-board is arranged a horizontal double-crank shaft 6, that is journaled in suitable bearings 7 on the main frame or casing of the machine. The inclined grain-board is arranged between the double-crank shaft and the cylinder to prevent the straw from becoming entangled with and clogging the crank-shaft, and said shaft is arranged parallel with the grain-board and the cylinder, as shown. This crank-shaft is provided with two series of cranks 8 9, one series of cranks 8 being situated on one side of the longitudinal axis of the shaft and the other series of cranks 9 being situated on the opposite side of said shaft diametrically opposite the cranks 8, but out of line with the same. This double-crank shaft operates two series of reciprocating fingers or spikes 10 11, which are pivotally connected to the cranks 8 9, respectively, of the crank-shaft 6. The series of fingers or spikes are arranged to operate in vertical planes and are successively projected or forced and withdrawn from the straw by the cranks on the shaft 6 after the straw passes the cylinder, one series of fingers being forced into the straw as the other series of fingers is withdrawn therefrom. These reciprocating fingers are guided in oscillating bars or shafts 12 13, which are arranged parallel with each other and situated above or on the plane of the lower edge of the inclined grain-board, said oscillating bars or shafts being journaled in stationary bearings on the main frame of the machine in order to serve as the fulcrum of the two series of the reciprocating fingers 10 11. These bars or shafts 12 13 lie below the crank-shaft nearly in the vertical plane of the same. They are suitably journaled in the main frame or casing, and each shaft or bar is provided with a series of apertures or perforations through which the reciprocating fingers operate, the perforations 12' in the guide bar or shaft 12 being arranged out of line with the perforations 13' in the adjoining guide bar or shaft 13, as will be seen by reference to Fig. I, in order to accommodate both series of fingers. These oscillating guide bars or shafts serve two useful purposes—first, as the fulcrum or turning-point of the series of fingers, in order to cause said fingers to sweep rearwardly through the straw and carry the same therewith after said fingers have been projected into the straw, and, second, the bars or shafts prevent the straw from being carried upward with the fingers on the upstroke thereof and thus obviate clogging of the machine.

By reference to Fig. III of the drawings it will be seen that when the crank-shaft is rotated in the direction indicated by the arrow the cranks 8 are nearly at their lowest position and the fingers 10 are in a depressed position to enter the straw and incline toward the front of the machine and the cylinder. As the shaft rotates, the cranks 8 pass the down-center, and the rock-shaft 12 rocks or oscillates to permit the fingers to swing or move in an arc of a circle and from the front toward the rear of the machine to assume the position shown in Fig. IV, whereby the fingers are projected into the straw, caused to separate the same, and carry the straw from a point in rear of the cylinder to the raker-bars. As the series of fingers 9 are projected into the straw, the fingers 9 are withdrawn therefrom, and as the fingers 8 are withdrawn from the straw at the angle shown the fingers 9 are projected or forced into the straw at a point just in rear of the cylinder, the action of the fingers 9 being precisely the same as the fingers 8. It will be seen that the two series of fingers act continuously on the straw to carry the straw away from the cylinder and that the straw is separated or spread out by the action of the fingers before it reaches the raker-bars.

In rear of the vertically-reciprocating fingers 8 9, I have provided a series of longitudinal raker-bars 15, each of which is provided with depending pickers 16, which act upon the straw as the raker-bars are depressed and carried rearward, so that the pickers operate to separate the grain from the straw, to spread the straw out uniformly or evenly over the entire surface of the grain-pan 4, and to gradually carry the straw to the rear or discharge end of the machine.

The raker-bars extend longitudinally of the machine nearly the entire length of the same—that is, from a point just in rear of the vertically-reciprocating fingers and the grain-board to the extreme rear end of the machine—whereby said raker-bars are caused to more efficiently separate the grain from the straw and to uniformly spread out the straw over the grain-pan 4 and over the vibrating rake-arms 20 21, which are carried by the rock-shafts 22 and located on the upper side of the grain-pan.

The longitudinal raker-bars are carried by two double-crank shafts 17 18, which are arranged parallel with each other and extend transversely across the machine above the grain-pan, and each crank-shaft has a double series of cranks 19 19', which are situated on diametrically-opposite sides of the axis of the shafts. The raker-bars are pivotally connected to corresponding cranks on both shafts, and said bars are carried by the cranks as the shafts rotate from the front toward the rear end of the machine, then lifted to the upper or top side of the casing and carried forward to the front of the machine, and again depressed into the straw to resume the operation, each raker-bar being carried in this manner in order to move the straw to the rear and agitate and spread the straw over the grain-pan and the vibrating rake-arms 20 21.

Changes in the form and proportion of parts and details of construction can be made without departing from the spirit or sacrificing the advantages of my invention.

Having thus fully described my invention, what I claim as new, and desire to secure by Letters Patent, is—

1. In a thrashing-machine and separator, the combination of a cylinder, a crank-shaft having the double row or series of cranks, the independent rocking guide-bars situated side by side and below the crank-shaft, and the independent series of fingers fitted in apertures in said guide-bars and connected to the cranks of the shaft, as and for the purpose described.

2. In a thrashing-machine and separator, the combination of a cylinder, a double-crank shaft located in rear of the cylinder and above the path of the grain, an inclined grain-board situated between the cylinder and the crank-shaft, the independent rocking guide-bars arranged below the crank-shaft and in rear of said grain-board, and the two series of fingers fitted in the respective guide-bars and connected to the cranks of the crank-shaft, substantially as described.

3. In a thrashing-machine, the combination of a cylinder, a crank-shaft arranged in rear of the cylinder above the same and having the alternate cranks 8 9, arranged on opposite sides of the axis thereof, the rock-shafts journaled in stationary bearings on the main frame of the machine and arranged below the crank-shaft, the series of alternate fingers connected to the cranks of the crank-shafts, and the inclined grain-board arranged between the cylinder and the crank and rock shafts, as and for the purpose described.

In testimony whereof I affix my signature in presence of two witnesses.

JOHN P. MONNETT.

Witnesses:
JOHN C. CARTLE,
FRANK H. INGERSOLL.